United States Patent [19]
Durkin et al.

[11] Patent Number: 5,099,516
[45] Date of Patent: Mar. 24, 1992

[54] DIGITAL COMPUTER CODE WORD IDENTIFICATION SYSTEM

[75] Inventors: Michael D. Durkin; Greg N. Stewart, both of Austin, Tex.

[73] Assignee: Dell Corporate Services Corporation, Austin, Tex.

[21] Appl. No.: 365,334

[22] Filed: Jun. 12, 1989

[51] Int. Cl.$^5$ .......................... G06F 9/00; H04L 9/32
[52] U.S. Cl. .................................. 380/4; 340/825.34
[58] Field of Search ............ 364/200, 900; 380/4; 340/824.34

[56] References Cited

U.S. PATENT DOCUMENTS

| | | | |
|---|---|---|---|
| 3,609,697 | 9/1971 | Blevins et al. | 364/200 |
| 4,118,789 | 10/1978 | Casto et al. | 364/900 |
| 4,246,638 | 1/1981 | Thomas | 364/200 |
| 4,328,542 | 5/1982 | Anastas et al. | 364/200 |
| 4,442,486 | 4/1984 | Mayer | 364/200 |
| 4,446,519 | 5/1984 | Thomas | 364/200 |
| 4,454,594 | 6/1984 | Heffron et al. | 364/900 |
| 4,458,315 | 7/1984 | Uchenick | 364/200 |
| 4,462,076 | 7/1984 | Smith, III | 364/200 |
| 4,462,078 | 7/1984 | Ross | 364/200 |
| 4,471,163 | 9/1984 | Donald et al. | 364/200 |
| 4,562,306 | 12/1985 | Chou et al. | 364/300 |
| 4,583,196 | 4/1986 | Koo | 364/900 |
| 4,584,665 | 4/1986 | Vrielink | 364/900 |
| 4,593,353 | 6/1986 | Pickholtz | 364/200 |
| 4,644,493 | 2/1987 | Chandra et al. | 364/900 |
| 4,646,234 | 2/1987 | Tolman et al. | 364/200 |
| 4,652,990 | 3/1987 | Pailen et al. | 364/200 |
| 4,654,792 | 3/1987 | Thomas | 364/200 |
| 4,683,553 | 7/1987 | Mollier | 380/4 |
| 4,685,055 | 8/1987 | Thomas | 364/200 |
| 4,685,056 | 8/1987 | Barnsdale, Jr. et al. | 364/200 |
| 4,688,169 | 8/1987 | Joshi | 364/200 |
| 4,740,890 | 4/1988 | William | 364/200 |
| 4,748,561 | 5/1988 | Brown | 364/200 |
| 4,757,534 | 7/1988 | Matyas et al. | 380/25 |
| 4,791,565 | 12/1988 | Dunham et al. | 364/200 |
| 4,796,220 | 1/1989 | Wolfe | 364/900 |
| 4,812,675 | 3/1989 | Goetting | 364/200 |
| 4,864,494 | 9/1989 | Kobus, Jr. | 364/200 |
| 4,866,769 | 9/1989 | Karp | 380/4 |
| 4,879,645 | 11/1989 | Tamada et al. | 364/200 |
| 4,888,798 | 12/1989 | Earnest | 380/4 |
| 4,903,296 | 2/1990 | Chandra et al. | 380/4 |
| 4,924,378 | 5/1990 | Hershey et al. | 364/200 |
| 4,937,863 | 6/1990 | Robert et al. | 380/4 |
| 4,959,861 | 9/1990 | Howlette | 380/4 |

*Primary Examiner*—Gareth D. Shaw
*Assistant Examiner*—Matthew C. Fagan
*Attorney, Agent, or Firm*—Thomas G. Devine

[57] ABSTRACT

A digital computer system has a central processor unit (CPU). A computer program, entered into the digital computer system for execution thereof, has a program code word embedded at an arbitrary location therein. An addressable programmable array of logic (PAL) is operatively connected to the CPU for receiving a READ signal originated by the CPU at the address of the PAL, the PAL being programmed to output a portion of a preset array code word in a response to the READ signal, and to output the remainder of the array code word in segments in response to subsequent READ signals at the same address. A data bus, connected to receive and transmit the portion and remainders of the array code word to the CPU for comparison with the program code word. The program code word and the array code word are compared and, if identical permit use of the program and do not permit use when the program code word and the array code word are not identical.

12 Claims, 2 Drawing Sheets

DIGITAL COMPUTER CODE WORD IDENTIFICATION SYSTEM

BACKGROUND OF THE INVENTION

1. Field of the Invention

This invention relates to a digital computer system having an identification device. More particularly, it relates to an identification device that is a programmable array of logic (PAL) that is programmed to provide an identification code in a series of READ references to the same address.

2. Description of the Prior Art

In the prior art, the main logic board of a central processor unit (CPU) has had an array of fuses imprinted on the surface thereof. The fuses have then been selectively opened to form a unique ID number. The fuse pattern is then read under control of the CPU to provide the unique ID number. If the board requires replacement, the unique ID number must again be set using the fuse technique, which may be difficult or impossible in the field. Also, the fuses take room on the board and require a relatively complex manufacturing technique.

Another prior art system is one wherein a unique ID number is placed in the system Read Only Memory (ROM). The ROM is read under control of the CPU and the unique ID number is recognized. The ROM, however, often needs updates and is generally easily and readily removed from the main circuit board. ROM copying machines are readily available and, therefore the ROM and its unique ID number may be copied and installed in an unauthorized system. Furthermore, when a field ROM update is required, it is difficult to produce a new ROM with the same unique ID number.

Still another prior art system involves storing a unique ID number in a separate Programmable Read Only Memory (PROM). The PROM is soldered into the main circuit board, making its removal difficult. However, once removed, copying is easily accomplished. Typically, a small PROM has an 8-bit word. In a typical application, a 24-bit word is required and, therefore, three (3) input/output (I/O) locations are needed. Since I/O space is very limited, the use of more than one location is a serious drawback.

This invention overcomes the weaknesses of the prior art as set out above.

BRIEF SUMMARY OF THE INVENTION

A digital computer system including a CPU has a device for providing a unique ID number for the computer system. In this preferred embodiment, the unique ID number is used to permit or reject the use of a computer program by comparing the unique ID number with an ID number embedded in the computer program, permitting use only if there is an exact match.

The device employed in the CPU is a logic array. In this preferred embodiment, it is a Programmable Array of Logic (PAL). The PAL is addressable by an Input/Output (I/O) Read cycle. A preset array code word (unique ID number) is formed in the PAL to be read out in consecutive segments. That is, the I/O READ cycle is performed at the same address on the PAL six times, in this preferred embodiment, to extract 4 bits each time, providing a unique ID number of 24-bits in the form of six hexadecimal digits. This size ID number will provide a unique ID number for over 16 million systems.

The PAL may be programmed in a standard PAL programmer which opens selected fuses set into the circuit to provide a desired interconnection of parts. The state of the fuses may be read back and ascertained, thereby checking the correctness of the desired circuit. Once having determined that correctness, a protection fuse in the PAL may be opened to prevent any unauthorized read-back of the state of the fuses. This is a feature available on PALs that is not available in a ROM or PROM, as set out above as the prior art. The computer program supplied for the digital computer system may be very expensive and the owner of the computer program, therefore, needs assurance that the program cannot be readily copied and used on more than one digital computer system.

By embedding a program code word (unique ID number) in the program, and comparing the program code word with the preset array code word, a determination is made of whether there is an identity and, if so, an authorized use of the computer program is in order.

Over the life of a digital computer system, the main circuit board will typically be revised to fix various operational problems. These revisions ordinarily affect the inter-reaction between firmware (contents of ROM) and hardware. To have a single version of firmware that will work with all of the revisions of the main circuit board, it is necessary that the particular revision be identified. Three input pins of the PAL are used to encode the revision number by simply tying the pins in a desired pattern of high and low voltages. Also, to identify the model type of computer system, four (4) input pins are tied to high or low voltages to encode one of a possible 16 different models.

A counter is formed in the PAL for counting the model type, the revision number, and the segments of the array code word, consecutively. The counter is advanced by one for every time an I/O Read cycle is initiated. In this preferred embodiment, when the counter is in state-0 the model type is transmitted from the input pins to output registers of the PAL. These output registers are connected to a data bus and transfer the model type to the CPU. When the counter is in state-1, the board revision number is transferred from the input pins of the PAL to the output registers for transmission via the data bus to the CPU.

When the counter is in states-2 through -7, the fixed segments of the array code word are transmitted to the CPU where they are assembled in a register and ultimately compared with the program code word.

The principle object of this invention is to provide a device for generating a unique ID number for a digital computer system, such device being inexpensive and difficult to copy. This and other objects will be made evident in the detailed description that follows.

DETAILED DESCRIPTION OF THE INVENTION

This invention involves comparing the program code word embedded in a computer program with an array code word set in a logic array. If the code words exactly correspond, then the program may be executed. The method and apparatus by which this is accomplished uses a single memory location and is difficult to defeat or copy. The following detailed description sets out this method and apparatus.

Figure 1:
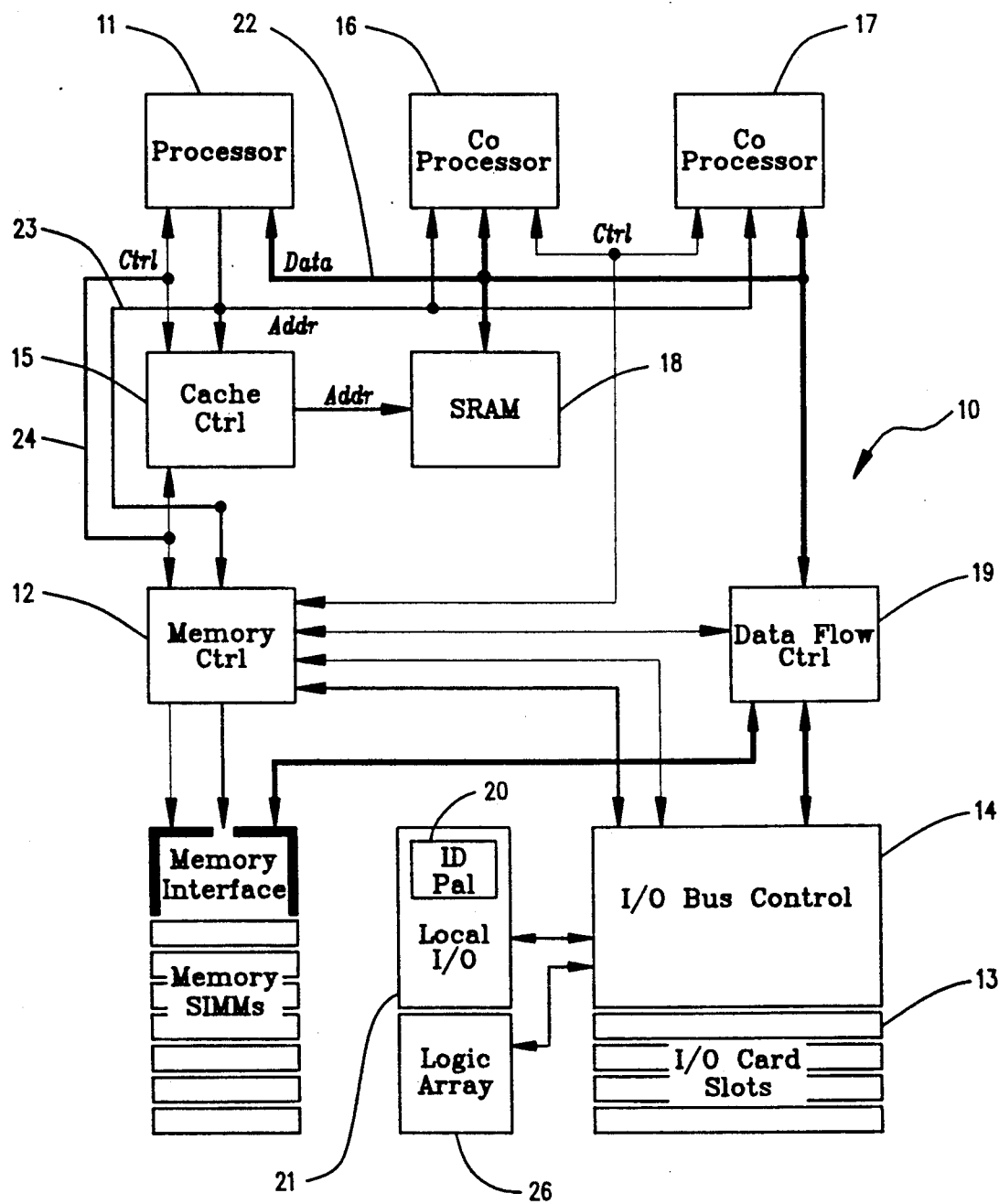
FIG. 1 is a block diagram illustrating the digital computer system of this invention.

FIG. 1 illustrates, in block form, the digital computer system 10 of the preferred embodiment of this invention. The invention is, of course, applicable to any digital computer system. CPU 11 is shown having a data bus connected to data flow control 19 and then to I/O bus control 14. Also from CPU 11 is address bus 23 which is shown connected to memory controller 12, which is also connected to I/O bus control 14. I/O bus control 14 is connected to the local I/O 21 which includes ID PAL 20. System 10 is shown having co-processors 16 and 17, CACHE memory 18, and CACHE control 15. In this preferred embodiment, processor 11 is an Intel Corporation 80386.

Figure 2:
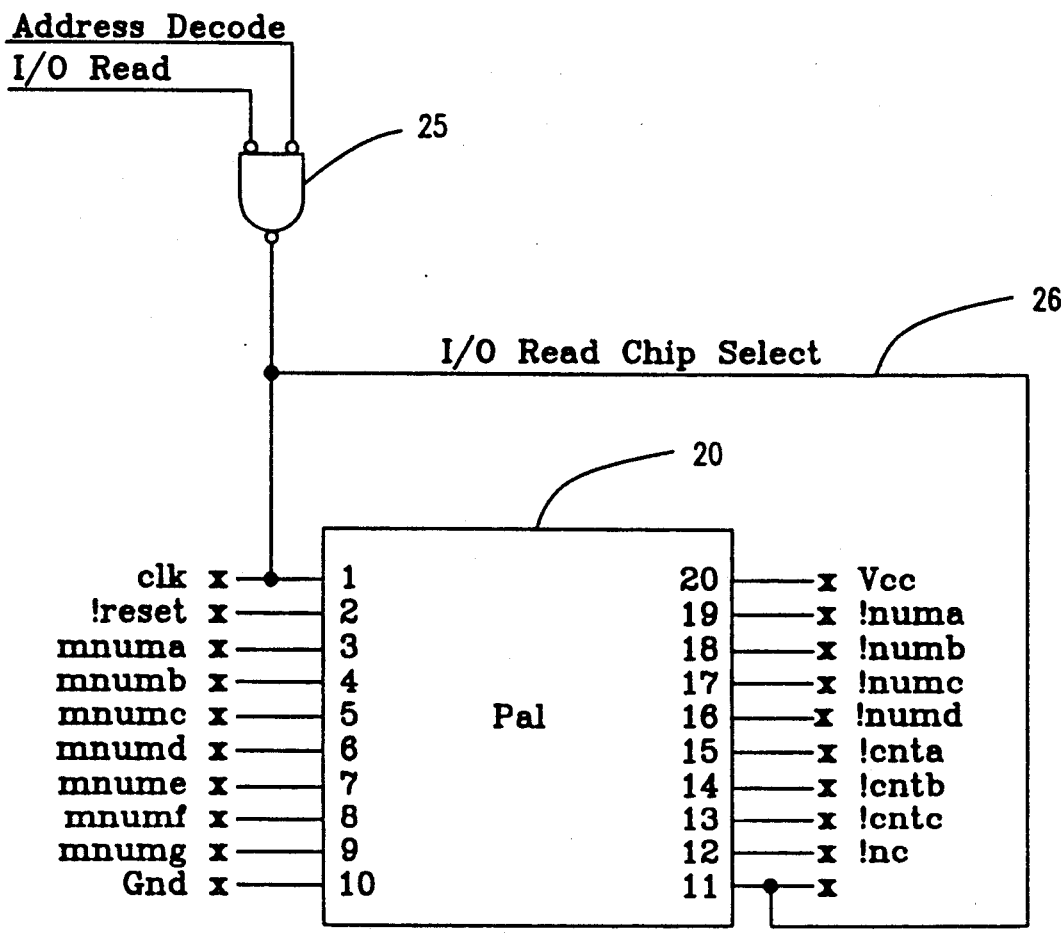
FIG. 2 is a block diagram illustrating the PAL and associated circuitry of this invention.

FIG. 2 illustrates PAL 20 which, in this preferred embodiment, is a type 16R8A, manufactured by Texas Instruments, Incorporated. Gate 25 has, as inputs, signals "ADDRESS DECODE" and "I/O READ" with its output connected to the CLK input and to output enable pin 11 of PAL 20. Signal "I/O READ" comes from processor 11 over control bus 24 through memory controller 12 and data flow controller 19. Signal "ADDRESS DECODE" originates in processor 11, and is transferred through address bus 23 to memory controller 12 and to data flow controller 19, to logic array 26 where the address decode is finalized, resulting in signal "ADDRESS DECODE". The output of gate 25 goes low when both I/O READ and ADDRESS DECODE are low. The output signal from gate 25 is the "I/O READ CHIP SELECT" signal on line 26.

PAL 20 has eight (8) register outputs whose output pins are pins 12-19. These pins are connected to the data bus and are enabled when signal I/O READ CHIP SELECT goes low. Data bus 22 takes the information output from PAL 20 to processor 11. The rising edge of signal I/O READ CHIP SELECT clocks new data into the PAL 20 output registers in preparation for the next READ cycle.

Input pins 3-9 have signals mnuma-mnumg entered, respectively. Four of these input signals are used for decoding the system model type; the remaining three inputs are used for encoding the number of the present system revision. Signals mnuma-mnumd provide the system model type and are formed by simply tying pins 3-6 to either a high or a low voltage. Likewise, signals mnume-mnumg provide the number of the system revision, and pins 7-9 are tied to either a high or a low voltage to provide those inputs.

In this preferred embodiment, the ID number is 24-bits and is set in the PAL in the form of six 4-bit hexadecimal digits which can be read on the low 4-bits of the data bus over six consecutive I/O READ cycles to the same address. Pins 15-13 provide signals cnta-cntc, the output of a counter formed in PAL 20. The count value is presented on the high three bits of the data bus during a READ cycle. In this way, CPU 11 is able to determine which digit of the ID number is being presented on the low 4-bits.

Output pins 19-16 provide outputs numa-numd, respectively. These signals form the 4-bit hexadecimal digit.

The counter increments from state-0 to state-7 and then wraps around to 0. Each READ to the PAL will increment the counter by 1. When the counter is in state-2, the first hexidecimal digit of the ID number can be read on the data bus. State-3 generates the second digit of the ID number, and so on. This process sends the full 24-bits of ID information to CPU 11 when the count reaches 7. The model type is read on the data bus when the counter is in state-0. The number of the revision is read when the counter is in state-1.

The following are definitions of signals and equations defining PAL 20. Also, the Fuse Plot defining all of the fuses opened to provide the circuit employed is shown. The hexadecimal ID number generated is shown on Page 7 as 002a5f.

```
Name        sec3;
Partno      ;
Revision    A00;

Designer    Mike Durkin;
Company     Dell Computer Corp;
Assembly    ;
Location    ;
Format      j;

/*****************************************************/
/*  Allowable Target Device Types:    16R8-A         */
/*****************************************************/
/*  machine ID, and model ID                         */
/*                                                   */
/*****************************************************/

/** Inputs **/

Pin 1   = clk      ;/* oscillator output - 50 MHz       */
Pin 2   = !reset   ;/* low true - sets counter to 7     */
Pin 3   = mnuma    ;/* model ID number - lowest bit     */
Pin 4   = mnumb    ;/* model ID number                  */
Pin 5   = mnumc    ;/* model ID number                  */
Pin 6   = mnumd    ;/* model ID number                  */
Pin 7   = mnume    ;/* model ID number                  */
```

```
Pin 8        = mnumf         ;/* model ID number                         */
Pin 9        = mnumg         ;/* model ID number                         */

/** Outputs **/

Pin 12       = !nc           ;/* not used - read as a 1                  */
Pin 13       = !cntc         ;/* state var 2                             */
Pin 14       = !cntb         ;/* state var 1                             */
Pin 15       = !cnta         ;/* state var 0                             */

Pin 16       = !numd         ;/* high bit of a hex digit                 */
Pin 17       = !numc         ;/*                                         */
Pin 18       = !numb         ;/*                                         */
Pin 19       = !numa         ;/* low bit of a hex digit                  */

MIN nc.d   = 4 ;
MIN cntc.d = 4 ;
MIN cntb.d = 4 ;
MIN cnta.d = 4 ;

$define     s0    'b'111
$define     s1    'b'110
$define     s2    'b'101
$define     s3    'b'100
$define     s4    'b'011
$define     s5    'b'010
$define     s6    'b'001
$define     s7    'b'000

$define     id0   'b'1111
$define     id1   'b'1110
$define     id2   'b'1101
$define     id3   'b'1100
$define     id4   'b'1011
$define     id5   'b'1010
$define     id6   'b'1001
$define     id7   'b'1000
$define     id8   'b'0111
$define     id9   'b'0110
$define     ida   'b'0101
$define     idb   'b'0100
$define     idc   'b'0011
$define     idd   'b'0010
$define     ide   'b'0001
$define     idf   'b'0000 nc.d   = 'b'0;

FIELD counter =   [cntc, cntb, cnta];

SEQUENCE   counter { present    s0
    if !reset next s1 ;
    if  reset next s7 ;
  present    s1
    if !reset next s2 ;
    if  reset next s7 ;
  present    s2
    if !reset next s3 ;
    if  reset next s7 ;
  present    s3
    if !reset next s4 ;
    if  reset next s7 ;
  present    s4
    if !reset next s5 ;
    if  reset next s7 ;
  present    s5
    if !reset next s6 ;
    if  reset next s7 ;
```

```
present    s6
   if !reset next s7 ;
   if  reset next s7 ;
present    s7
   if !reset next s0 ;
   if  reset next s7 ;

}

FIELD   idnums  =   [decoded, decodec, decodeb, decodea];

table counter  => idnums   {

/*  s7   =>  id0;   These two counter values output model ID values. */
/*  s0   =>  id0;   The equations are defined farther down.           */
    s1   =>  id0;
    s2   =>  id0;
    s3   =>  id2;
    s4   =>  ida;
    s5   =>  id5;
    s6   =>  idf;

}
    numd.d    =    decoded
              #    counter:[s7] & !mnumd
              #    counter:[s0] ;
    numc.d    =    decodec
              #    counter:[s7] & !mnumc
              #    counter:[s0] & !mnumg ;
    numb.d    =    decodeb
              #    counter:[s7] & !mnumb
              #    counter:[s0] & !mnumf ;
    numa.d    =    decodea
              #    counter:[s7] & !mnuma
              #    counter:[s0] & !mnume ;
```

************************************************************************
                                sec3
************************************************************************

```
CUPL            3.00 Serial# MD-300-4404
Device          p16r8  Library DLIB-h-24-10

Name            sec3
Partno
Revision        A00

Designer        Mike Durkin
Company         Dell Computer Corp
Assembly
Location
```

==========================================================================
                         Expanded Product Terms
==========================================================================

```
cnta.d   =>
    !cnta & !reset cntb.d   =>
    !cnta & !cntb & !reset
  # cnta & cntb & !reset cntc.d   =>
    !cnta & !cntb & !cntc & !reset
  # cntb & cntc & !reset
  # cnta & cntc & !reset counter  =>
    cntc , cntb , cnta
```

```
decodea =>
    !cnta & cntb & cntc
  # cnta & !cntb & cntc
  # !cnta & !cntb & cntc
  # cnta & cntb & !cntc
  # 0
  # 0 decodeb =>
    !cnta & cntb & cntc
  # cnta & !cntb & cntc
  # 0
  # 0
  # !cnta & cntb & !cntc
  # 0 decodec =>
    !cnta & cntb & cntc
  # cnta & !cntb & cntc
  # !cnta & !cntb & cntc
  # cnta & cntb & !cntc
  # 0
  # 0 decoded =>
    !cnta & cntb & cntc
  # cnta & !cntb & cntc
  # !cnta & !cntb & cntc
  # 0
  # !cnta & cntb & !cntc
  # 0 idnums =>
    decoded , decodec , decodeb , decodea nc.d   =>
    0 numa.d =>
    !cnta & cntb & cntc
  # cnta & !cntb & cntc
  # !cnta & !cntb & cntc
  # cnta & cntb & !cntc
  # 0
  # 0
  # !cnta & !cntb & !cntc & !mnuma
  # cnta & cntb & cntc & !mnume numb.d =>
    !cnta & cntb & cntc
  # cnta & !cntb & cntc
  # 0
  # 0
  # !cnta & cntb & !cntc
  # 0
  # !cnta & !cntb & !cntc & !mnumb
  # cnta & cntb & cntc & !mnumf numc.d =>
    !cnta & cntb & cntc
  # cnta & !cntb & cntc
  # !cnta & !cntb & cntc
  # cnta & cntb & !cntc
  # 0
  # 0
  # !cnta & !cntb & !cntc & !mnumc
  # cnta & cntb & cntc & !mnumg
```

```
numd.d =>
    !cnta & cntb & cntc
  # cnta & !cntb & cntc
  # !cnta & !cntb & cntc
  # 0
  # !cnta & cntb & !cntc
  # 0
  # !cnta & !cntb & !cntc & !mnumd
  # cnta & cntb & cntc
```

================================================================
                          Symbol Table
================================================================

| Pin Pol | Variable Name | Ext | Pin | Type | Pterms Used | Max Pterms | Min Level |
|---|---|---|---|---|---|---|---|
|   | clk     |   | 1  | V | - | - | - |
| ! | cnta    |   | 15 | V | - | - | - |
| ! | cnta    | d | 15 | X | 1 | 8 | 4 |
| ! | cntb    |   | 14 | V | - | - | - |
| ! | cntb    | d | 14 | X | 2 | 8 | 4 |
| ! | cntc    |   | 13 | V | - | - | - |
| ! | cntc    | d | 13 | X | 3 | 8 | 4 |
|   | counter |   | 0  | F | - | - | - |
|   | decodea |   | 0  | I | 6 | - | - |
|   | decodeb |   | 0  | I | 6 | - | - |
|   | decodec |   | 0  | I | 6 | - | - |
|   | decoded |   | 0  | I | 6 | - | - |
|   | idnums  |   | 0  | F | - | - | - |
|   | mnuma   |   | 3  | V | - | - | - |
|   | mnumb   |   | 4  | V | - | - | - |
|   | mnumc   |   | 5  | V | - | - | - |
|   | mnumd   |   | 6  | V | - | - | - |
|   | mnume   |   | 7  | V | - | - | - |
|   | mnumf   |   | 8  | V | - | - | - |
|   | mnumg   |   | 9  | V | - | - | - |
| ! | nc      |   | 12 | V | - | - | - |
| ! | nc      | d | 12 | X | 1 | 8 | 4 |
| ! | numa    |   | 19 | V | - | - | - |
| ! | numa    | d | 19 | X | 8 | 8 | 0 |
| ! | numb    |   | 18 | V | - | - | - |
| ! | numb    | d | 18 | X | 8 | 8 | 0 |
| ! | numc    |   | 17 | V | - | - | - |
| ! | numc    | d | 17 | X | 8 | 8 | 0 |
| ! | numd    |   | 16 | V | - | - | - |
| ! | numd    | d | 16 | X | 8 | 8 | 0 |
| ! | reset   |   | 2  | V | - | - | - |

LEGEND   F : field            D : default variable        M : extended node
         N : node             I : intermediate variable   T : function
         V : variable         X : extended variable       U : undefined ================================================================
                          Fuse Plot
================================================================

```
Pin #19
  00000 ---------------------x----x---x----
  00032 ---------------------x--x----x----
  00064 ---------------------x----x---x----
  00096 ---------------------x---x--x-----
  00128 xxxxxxxxxxxxxxxxxxxxxxxxxxxxxxxx
  00160 xxxxxxxxxxxxxxxxxxxxxxxxxxxxxxxx
  00192 -----x--------------x---x---x-----
  00224 ---------------------x-x-x---x----
```

```
Pin #18
  00256  ---------------------x----x---x----
  00288  ---------------------x--x----x----
  00320  xxxxxxxxxxxxxxxxxxxxxxxxxxxxxxxx
  00352  xxxxxxxxxxxxxxxxxxxxxxxxxxxxxxxx
  00384  ---------------------x----x--x----
  00416  xxxxxxxxxxxxxxxxxxxxxxxxxxxxxxxx
  00448  ---------x----------x---x--x----
  00480  ---------------------x--x-x-x----
Pin #17
  00512  ---------------------x----x---x----
  00544  ---------------------x--x----x----
  00576  ---------------------x--x----x----
  00608  ---------------------x---x--x-----
  00640  xxxxxxxxxxxxxxxxxxxxxxxxxxxxxxxx
  00672  xxxxxxxxxxxxxxxxxxxxxxxxxxxxxxxx
  00704  ---------------x----x---x---x-----
  00736  ---------------------x---x---x-x--
Pin #16
  00768  ---------------------x----x---x----
  00800  ---------------------x--x----x----
  00832  ---------------------x---x----x----
  00864  xxxxxxxxxxxxxxxxxxxxxxxxxxxxxxxx
  00896  ---------------------x----x--x-----
  00928  xxxxxxxxxxxxxxxxxxxxxxxxxxxxxxxx
  00960  -------------------xx---x---x-----
  00992  ---------------------x---x---x----
Pin #15
  01024  x-------------------x-------------
  01056  xxxxxxxxxxxxxxxxxxxxxxxxxxxxxxxx
  01088  xxxxxxxxxxxxxxxxxxxxxxxxxxxxxxxx
  01120  xxxxxxxxxxxxxxxxxxxxxxxxxxxxxxxx
  01152  xxxxxxxxxxxxxxxxxxxxxxxxxxxxxxxx
  01184  xxxxxxxxxxxxxxxxxxxxxxxxxxxxxxxx
  01216  xxxxxxxxxxxxxxxxxxxxxxxxxxxxxxxx
  01248  xxxxxxxxxxxxxxxxxxxxxxxxxxxxxxxx
Pin #14
  01280  x-------------------x---x---------
  01312  x-------------------x---x---------
  01344  xxxxxxxxxxxxxxxxxxxxxxxxxxxxxxxx
  01376  xxxxxxxxxxxxxxxxxxxxxxxxxxxxxxxx
  01408  xxxxxxxxxxxxxxxxxxxxxxxxxxxxxxxx
  01440  xxxxxxxxxxxxxxxxxxxxxxxxxxxxxxxx
  01472  xxxxxxxxxxxxxxxxxxxxxxxxxxxxxxxx
  01504  xxxxxxxxxxxxxxxxxxxxxxxxxxxxxxxx
Pin #13
  01536  x-------------------x---x---x-----
  01568  x--------------------x---x---x-----
  01600  x-------------------x-------x----
  01632  xxxxxxxxxxxxxxxxxxxxxxxxxxxxxxxx
  01664  xxxxxxxxxxxxxxxxxxxxxxxxxxxxxxxx
  01696  xxxxxxxxxxxxxxxxxxxxxxxxxxxxxxxx
  01728  xxxxxxxxxxxxxxxxxxxxxxxxxxxxxxxx
  01760  xxxxxxxxxxxxxxxxxxxxxxxxxxxxxxxx
Pin #12
  01792  xxxxxxxxxxxxxxxxxxxxxxxxxxxxxxxx
  01824  xxxxxxxxxxxxxxxxxxxxxxxxxxxxxxxx
  01856  xxxxxxxxxxxxxxxxxxxxxxxxxxxxxxxx
  01888  xxxxxxxxxxxxxxxxxxxxxxxxxxxxxxxx
  01920  xxxxxxxxxxxxxxxxxxxxxxxxxxxxxxxx
  01952  xxxxxxxxxxxxxxxxxxxxxxxxxxxxxxxx
  01984  xxxxxxxxxxxxxxxxxxxxxxxxxxxxxxxx
  02016  xxxxxxxxxxxxxxxxxxxxxxxxxxxxxxxx LEGEND    X : fuse not blown
          - : fuse blown
```

MODE OF OPERATION OF THE INVENTION

A memory cycle is initiated by CPU 11 with address data transmitted over line 23 to memory controller 12 and control data (I/O READ) transmitted over line 24 to memory controller 12. The address information, the ADDRESS DECODE, and I/O READ are transmitted to I/O bus control 14 and then to local I/O 21 where the address information is decoded. The signals are then received by gate 25 providing I/O READ CHIP SELECT on line 26 to the clock input on pin 1 and the output enable on pin 11.

When I/O READ CHIP SELECT goes low, output pins 12–19 are enabled. These pins are connected to the data bus so that the data contained therein is transmitted back to CPU 11 through data bus 22. The rising edge of I/O READ CHIP SELECT then clocks new data into the output flip-flops in preparation for the next read cycle.

When the counter (output pins 15–13) is in state-0, the model type of the digital computer system set on input pins 3–6 is transmitted to output pins 19–16 for transmission over the low 4-bits of data bus 22 to CPU 11. At the same time, the counter value of 0 is transmitted over the high 3-bits of data bus 22.

When the counter is in state-1, the revision number (present on pins 7–9 of the input) is transmitted to output pins 19–16 and transmitted to CPU 11, along with count-1.

When the counter is in state-2, the first internally stored hexadecimal digit of the 24-bit array code word is transmitted over the low 4-bits of the data bus, together with the counter state of 2 over the high 3-bits of the data bus. When the counter is in state-3, the next hexadecimal digit is sent over the low 4-bits of the data bus, together with the count of 3 over the high 3-bits of the data bus. This procedure continues until all six hexadecimals digits have been assembled into a 24-bit word in CPU 11. Then, CPU 11 compares the array code word with the program code word which has been embedded in the computer program to determine whether they compare exactly. If they do, then the computer program can be executed in the digital computer system. If not, the program cannot be executed.

Those skilled in the art may use components different from those suggested herein, different digital computer systems, all without departing from the spirit and scope of this invention which is limited only by the appended claims.

The invention claimed is:

1. A method of identifying a digital computer system having a central processor unit (CPU) and a memory, comprising the steps of:
   (a) embedding a program code word in a computer program;
   (b) entering the computer program by way of the CPU into the memory of the digital computer system;
   (c) programming an addressable logic array, external to the system, with a preset array code word, the addressable logic array comprising a programmable array of logic (PAL);
   (d) reading a portion of the preset array code word by way of the CPU at an address of the logic array;
   (e) subsequently reading the remaining portion of the preset array code word by way of the CPU at the same address of the logic array;
   (f) assembling the preset array code word with the portion and the remaining portion by way of the CPU;
   (g) comparing the program code word with the preset array code word by way of the CPU; and
   (h) causing the CPU to refuse to execute the program if the program code word and the preset array code word are not identical, and executing the program if the program code word and the preset array code word are identical.

2. The method of claim 1 wherein the step of programming comprises opening desired fuses in the PAL.

3. The method of claim 2, further comprising the step of counting the portion and the remaining portion of the array code word, a count thereby identifying the portion and the remaining portion of the CPU.

4. The method of claim 3 wherein the program code word and the array code word each comprise twenty-four bits.

5. The method of claim 4 wherein the portion of the array code word comprises four bits, in the step of subsequently reading the remaining portion comprises reading five subsequent times at the same address of the logic array, providing four-bit segments each time.

6. A digital computer system, including a central processor unit (CPU) and a memory, comprising:
   (a) a computer program stored in the memory of the digital computer system for execution thereof, the program having a program code word embedded at an arbitrary location therein;
   (b) an addressable identification logic array, operatively connected to the CPU for receiving a read signal originated by the CPU at an address of the logic array, the logic array being programmed to output a portion of a preset array code word in response to the read signal at the address of the logic array and the remaining portion of the array code word in response to at least one subsequent read signal at the same address of the logic array, the logic array comprising a counter for counting the read signal and the at least one subsequent read signal to identify the portion and the remaining portion of the array code word to enable the logic array to output the portion and the remaining portion in the proper sequence; and
   (c) a data bus, connected to the logic array and the CPU for transmitting the portion and the remaining portion of the array code word to the CPU for comparison with the programmed code word by the CPU to permit execution of the program by the CPU when the program code word and the array code word are identical, and to not permit execution of the program when the program code word and the array code word are not identical.

7. The system of claim 6 wherein the logic array further comprises a programmable array of logic (PAL), programmed externally of the system by opening selected fuses to form the logic array.

8. The system of claim 7 wherein the PAL comprises a security fuse, opened and positioned in the logic array to prevent identifying the opened fuses.

9. The system of claim 8 wherein the program code word and the array code word each comprise twenty-four bits.

10. The system of claim 9 wherein the portion of the array code word comprises four bits, and the at least one subsequent read signal includes five subsequent read signals, causing the PAL to output four-bit segments for each subsequent read signal.

11. The system of claim 10 wherein the PAL further comprises a first plurality of input pins, selectively tied to high and low voltages to encode a system model type, and to transfer the encoded system model type to the data bus at a first predetermined count of the counter.

12. The system of claim 11 wherein the PAL further comprises a second plurality of input pins, selectively tied to high and low voltages to encode a number of a present system revision, and to transfer the number to the data bus at a second predetermined count of the counter.

* * * * *